US011373373B2

(12) United States Patent
Scott, II et al.

(10) Patent No.: US 11,373,373 B2
(45) Date of Patent: Jun. 28, 2022

(54) METHOD AND SYSTEM FOR TRANSLATING AIR WRITING TO AN AUGMENTED REALITY DEVICE

(71) Applicant: INTERNATIONAL BUSINESS MACHINES CORPORATION, Armonk, NY (US)

(72) Inventors: Willie L. Scott, II, Austin, TX (US); Charu Pandhi, Round Rock, TX (US); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/659,815

(22) Filed: Oct. 22, 2019

(65) Prior Publication Data
US 2021/0118232 A1 Apr. 22, 2021

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ........ G06F 3/017; G06F 3/011; G06T 19/006; G06V 20/20; G02B 2027/0138
See application file for complete search history.

(56) References Cited

U.S. PATENT DOCUMENTS 6,486,874 B1 * 11/2002 Muthuswamy ..... G06F 3/04883
178/18.01
8,830,168 B2 * 9/2014 Underkoffler ......... G06F 3/0325
345/158
(Continued)

FOREIGN PATENT DOCUMENTS

| CN | 102436348 B | * | 5/2013 | .......... G06F 3/0346 |
| CN | 109857322 A | * | 6/2019 | .......... G06F 3/0488 |
| WO | 2018211103 A1 | | 11/2018 | |

OTHER PUBLICATIONS

Hiranandani et al., "Enhanced Personalized Targeting Using Augmented Reality", IEEE Xplore, Retrieved from Internet Feb. 21, 2022, 14 Pages, https://ieeexplore.ieee.org/document/8088451.
(Continued)

*Primary Examiner* — Ryan R Yang
(74) *Attorney, Agent, or Firm* — Steven M. Bouknight (57) ABSTRACT

Techniques for translating air writing to augmented reality (AR) devices are described. In one embodiment, a method includes receiving indications of gestures from an originator. The indications identify movement in three dimensions that correspond to an emphasis conferred on one or more words that are air-written by the originator and are configured to be displayed by a plurality of AR devices. The method includes analyzing the identified movement to determine a gesture type associated with the emphasis, where the gesture type includes a first emphasis to be conferred on the air-written words. The method includes providing a display of the air-written words on a first AR device of the plurality of AR devices. The first emphasis is conferred on the words on the display of the first AR device using a first gesture display style based on a profile of a first user utilizing the first AR device.

20 Claims, 7 Drawing Sheets (51) Int. Cl.
*G06F 3/04815* (2022.01)
*G02B 27/01* (2006.01)
*G06V 20/20* (2022.01)

(52) U.S. Cl.
CPC .......... *G06F 3/017* (2013.01); *G06F 3/04815* (2013.01); *G06V 20/20* (2022.01); *G02B 2027/0138* (2013.01)

(56) References Cited

U.S. PATENT DOCUMENTS

| | | | |
|---|---|---|---|
| 9,164,590 | B2 | 10/2015 | Patel et al. |
| 10,521,074 | B2* | 12/2019 | Graf ...................... G06F 3/0482 |
| 2007/0057911 | A1 | 5/2007 | Fateh |
| 2007/0299713 | A1* | 12/2007 | Macbeth ............... G06F 16/958 |
| | | | 705/7.15 |
| 2008/0293395 | A1* | 11/2008 | Mathews .............. G06F 16/957 |
| | | | 455/418 |
| 2013/0019204 | A1* | 1/2013 | Kotler .................. G06F 3/0482 |
| | | | 715/833 |
| 2013/0179844 | A1* | 7/2013 | Mandic ................. G06F 3/0416 |
| | | | 715/863 |
| 2013/0212453 | A1 | 8/2013 | Gudai |
| 2014/0028712 | A1 | 1/2014 | Keating |
| 2014/0157209 | A1 | 6/2014 | Dalal et al. |
| 2015/0084859 | A1* | 3/2015 | Itzhaik ............... G06K 9/00355 |
| | | | 345/156 |
| 2015/0346946 | A1* | 12/2015 | Kelso .................... G06F 3/0484 |
| | | | 715/763 |
| 2016/0203362 | A1 | 7/2016 | Huang |
| 2016/0364010 | A1 | 12/2016 | Amma |
| 2017/0249861 | A1 | 8/2017 | Border |
| 2019/0057266 | A1 | 2/2019 | Dow et al. |
| 2020/0302166 | A1* | 9/2020 | Meier .................. G06K 9/2072 |
| 2020/0320782 | A1* | 10/2020 | Cowburn ................ G06T 17/05 |

OTHER PUBLICATIONS

Stearns et al., "Design of an Augmented Reality Magnification Aid for Low Vision Users", ASSETS' 18, Oct. 22-24, 2018, 12 Pages. https://dl.acm.org/doi/10.1145/3234695.3236361.

Tapworks, "Bring Bottles, Cups, & cans to life in WebAR with Zappar's new curved Surface Tracking", Retrieved from Internet Feb. 21, 2022, 9 Pages. https://zap.works/.

* cited by examiner

METHOD AND SYSTEM FOR TRANSLATING AIR WRITING TO AN AUGMENTED REALITY DEVICE

BACKGROUND

The present invention relates to augmented reality devices, and, more particularly, to a system and method for translating air writing to an augmented reality device.

Augmented reality (AR) and/or virtual reality (VR) allow a user to experience artificial sensory simulations that are provided with assistance by a computer. AR typically refers to computer-generated simulations that integrate real-world sensory input with overlaid computer-generated elements, such as sounds, videos, images, graphics, etc. VR typically refers to an entirely simulated world that is computer-generated. In both AR and VR environments, a user may interact with, move around, and otherwise experience the environment from the user's perspective. AR/VR technology is being used in a variety of different industries, such as virtual communication for consumers and businesses, gaming, manufacturing and research, training, and medical applications.

One application of AR/VR technology is for displaying air-writing. Air-writing refers to writing of linguistic characters or words in a free space by hand or finger movements. These hand or finger movements are tracked using various sensors and the resulting "air-written" characters or words are generated for display by display devices, such as AR and/or VR headsets or other devices.

While existing systems provide mechanisms that allow air-writing to be displayed on AR/VR devices, it would be beneficial for individuals to have air-written content displayed in a way that is personalized to their preferences and/or capabilities, in order to improve content accessibility and content consumption.

SUMMARY

According to an embodiment, a method for translating air writing to an augmented reality (AR) device is provided. The method includes receiving indications of gestures from an originator. The indications identify movement in three dimensions that correspond to an emphasis conferred on one or more words that are air-written by the originator and are configured to be displayed by a plurality of AR devices. The method also includes analyzing the identified movement to determine a gesture type associated with the emphasis. The gesture type includes a first emphasis to be conferred on the one or more words that are air-written by the originator. The method further includes providing a display of the one or more words air-written by the originator on a first AR device of the plurality of AR devices. The first emphasis is conferred on the one or more words on the display of the first AR device using a first gesture display style based on a profile of a first user utilizing the first AR device.

In another form, a computer program product for translating air writing to an augmented reality (AR) device is provided. The computer program product includes a computer readable storage medium having program instructions embodied therewith, the program instructions executable by a processor to cause the processor to perform a method that includes receiving indications of gestures from an originator. The indications identify movement in three dimensions that correspond to an emphasis conferred on one or more words that are air-written by the originator and are configured to be displayed by a plurality of AR devices. The program instructions also include causing the processor to perform a method that includes analyzing the identified movement to determine a gesture type associated with the emphasis. The gesture type includes a first emphasis to be conferred on the one or more words that are air-written by the originator. The program instructions also include causing the processor to perform a method that includes providing a display of the one or more words air-written by the originator on a first AR device of the plurality of AR devices. The first emphasis is conferred on the one or more words on the display of the first AR device using a first gesture display style based on a profile of a first user utilizing the first AR device.

In another form, a system for translating air writing to an augmented reality (AR) device is provided. The system includes one or more AR devices and an air writing system in communication with the one or more AR devices. The air writing system includes at least one processor configured to perform a method that includes receiving indications of gestures from an originator. The indications identify movement in three dimensions that correspond to an emphasis conferred on one or more words that are air-written by the originator and are configured to be displayed by the one or more AR devices. The processor is also configured to perform a method that includes analyzing the identified movement to determine a gesture type associated with the emphasis. The gesture type includes a first emphasis to be conferred on the one or more words that are air-written by the originator. The processor is also configured to perform a method that includes providing a display of the one or more words air-written by the originator on a first AR device of the one or more AR devices. The first emphasis is conferred on the one or more words on the display of the first AR device using a first gesture display style based on a profile of a first user utilizing the first AR device.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

According to the techniques presented herein, a method and system for translating air writing to an augmented reality (AR) device is provided to perform modulation of the output AR visualization of the air written content to simulate emphasis or other cues and to personalize a user's display of the air written content based on that user's profile.

Figure 1:
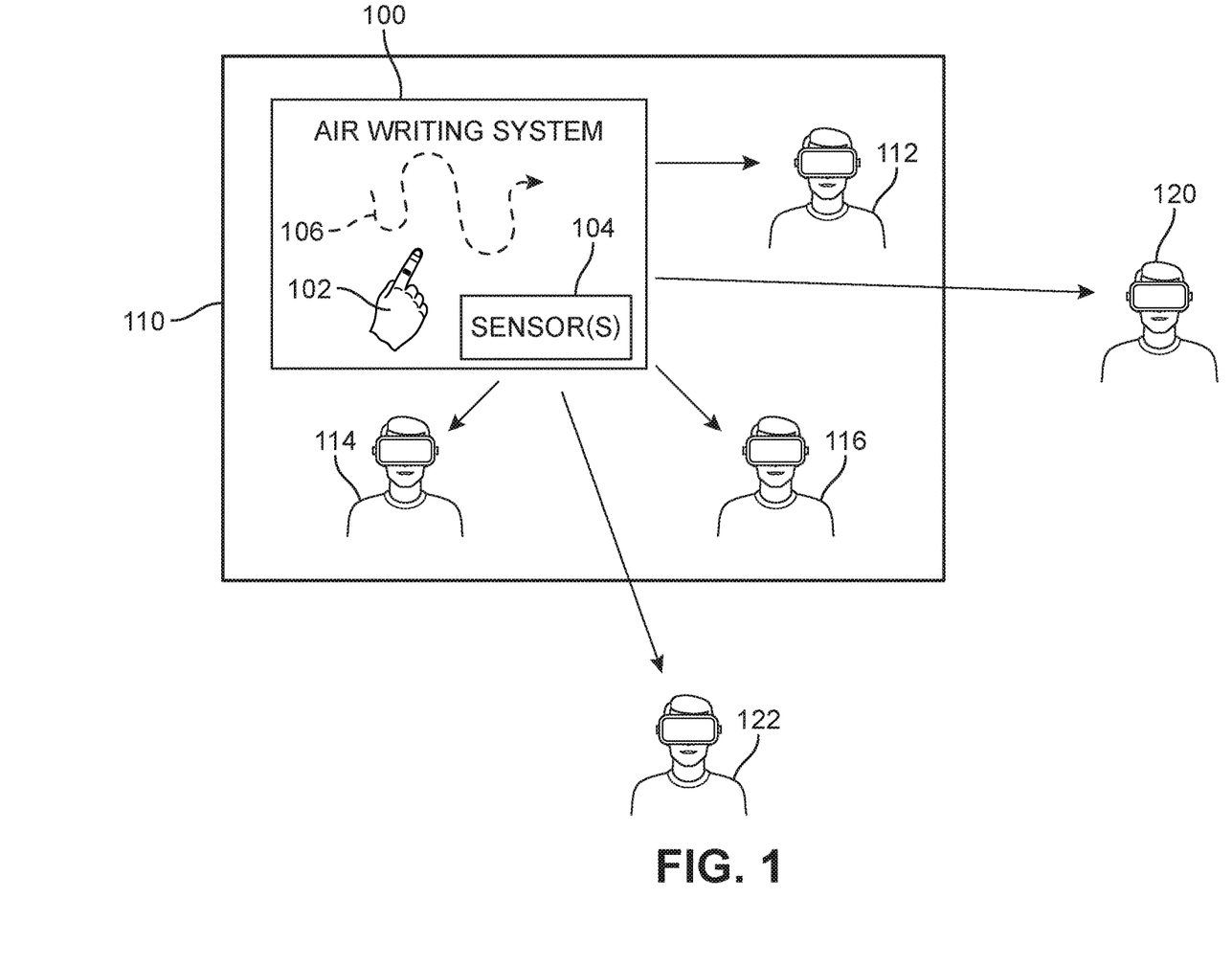
FIG. 1 is a schematic view of an example embodiment of an air writing system for translating air writing to augmented reality (AR) devices.

With reference now to FIG. 1, an example embodiment of an air writing system 100 for translating air writing to AR devices is shown. In some embodiments, a user or person may use air writing system 100 to generate air-written content that may be viewed using one or more AR devices. As used throughout this description and in the claims, the user or person generating content using the air writing system (e.g., air writing system 100) is referred to herein as an originator of such air-written content. In an example embodiment, the originator may generate the air-written content by making a series of indications of gestures using a hand or finger that correspond to characters (i.e., letters, numbers, and other symbols) and/or words.

In this embodiment, a hand 102 of the originator may be tracked or monitored by one or more sensors 104 of air writing system 100. The indications of gestures made by hand 102 of the originator include movements of hand 102 in three dimensions that are identified by the one or more sensors 104. These identified movements correspond to one or more characters and/or words that are air-written by the originator. For example, the one or more sensors 104 can include accelerometers, gyroscopes, image sensors (i.e., cameras or video recording devices), RFID, wireless sensors, and other sensors configured to track or capture movement of hand 102 of the originator. Additionally, in some cases, one or more of sensors 104 may be worn by the originator, such as on hand 102, a wrist, or a finger, or may be physically separate from the originator, such as the case with image sensors or other motion tracking or capturing sensors.

For example, as shown in FIG. 1, the originator may make a plurality of indications of gestures 106 using hand 102, which movements are identified using the one or more sensors 104. The identified movements by sensors 104 associated with indications of gestures 106 by hand 102 are converted or translated into characters and/or words by air writing system 100 that are configured to be displayed by a plurality of AR devices. As shown in FIG. 1, the plurality of AR devices may include one or more users of AR devices that are located in physical proximity to the originator, such as users co-located within an environment 110 with the originator, for example, a classroom, conference room, exhibit hall, etc., as well as one or more users of AR devices that are remotely located from the originator. That is, as shown in this embodiment, there is a one-to-many relationship between the originator and the users of the AR devices. However, in other embodiments, the techniques described herein may be used for a one-to-one relationship between the originator and a single user of an AR device.

In this embodiment, environment 110 includes the originator, a first user associated with a first AR device 112, a second user associated with a second AR device 114, and a third user associated with a third AR device 116. Additionally, a fourth user associated with a fourth AR device 120 and a fifth user associated with a fifth AR device 122 are remotely located from the originator (i.e., not present within the same physical location as environment 110). With this configuration, the air-written content generated by the originator may be viewed on the displays of AR devices of users that are in physical proximity (e.g., within environment 110) and those that are remotely located. In various embodiments, the AR devices associated with the users may take different forms, such as headsets, glasses, smart phones, tablets, laptop computers, or other devices that are configured to display air-written content. Therefore, while AR devices 112, 114, 116, 120, 122 are shown in FIG. 1 in the form of AR headsets, it should be understood that other AR-capable devices may be used.

As will be described in more detail below, the example embodiments provide techniques for identifying movement in three dimensions associated with the indications of gestures made by the originator (e.g., gestures 106 made using hand 102) that correspond to an emphasis conferred on one or more words that are air-written by the originator and are configured to be displayed by the plurality of AR devices.

Figure 2:
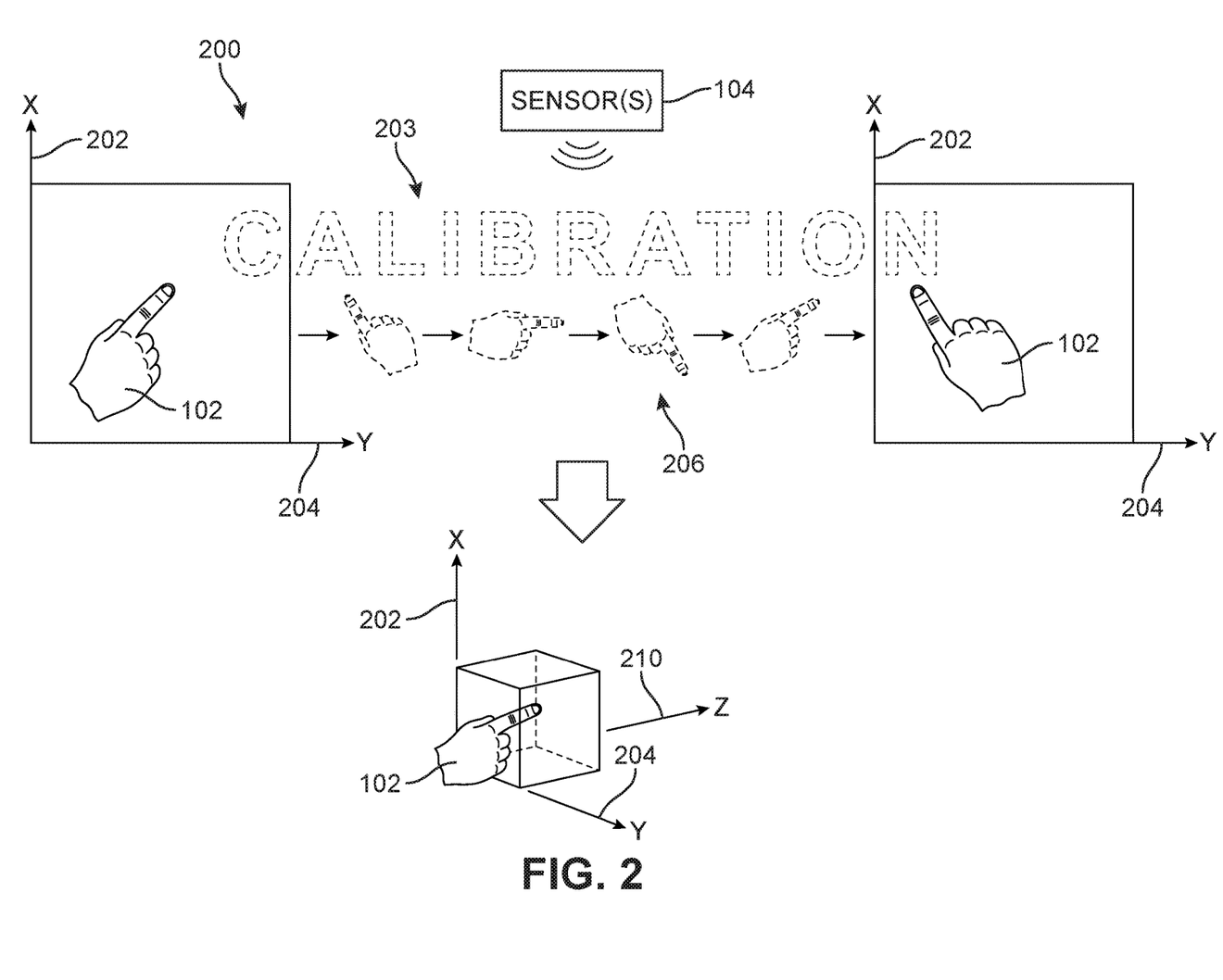
FIG. 2 is a representative view of an example embodiment of calibrating an air writing system.

Referring now to FIG. 2, an example embodiment of calibrating air writing system 100 by the originator. In an example embodiment, a calibration process 200 may be used by the originator to determine an initial orientation of the originator and/or hand 102 of the originator. For example, in this embodiment, calibration process 200 includes using the one or more sensors 104 to determine the initial orientation of hand 102 of the originator relative to a two-dimensional coordinate plane defined by an X axis 202 and a Y axis 204. In some embodiments, during calibration process 200, the originator may make a series of indications of gestures 206 that correspond to one or more characters 208, for example, in this case, spelling out the word "CALIBRATION".

Based on the computation or determination of the initial two-dimensional coordinate plane (i.e., the X-Y plane defined by X axis 202 and Y axis 204), a third dimension orthogonal to the initial two dimensional coordinate plane may be determined. As shown in FIG. 2, the third dimension is defined by a Z axis 210 that is orthogonal to both X axis 202 and Y axis 204. The Z-dimension projection (i.e., along Z axis 210) of movement of hand 102 of the originator identified by the one or more sensors 104 during the air-writing process will be associated with an AR visualization modification of the air written content on the displays of the AR devices to simulate emphasis or other cues conferred on one or more words that are air-written by the originator.

In some embodiments, calibration process 200 may vary based on the number and/or type of sensors 104 used by air writing system 100 to track or capture the movements of hand 102 of the originator. For example, in the case where sensors 104 include a single-array sensor, the determination of the Z-dimension (e.g., Z axis 210) occurs only after a predetermined threshold associated with calibration process 200 has been achieved. The predetermined threshold may include a set number of characters or letters, a specific time period, and/or a minimum air-writing length. Once the predetermined threshold for calibration process 200 has been met since the start of the air writing process, the initial two-dimensional coordinate plane (i.e., the X-Y plane defined by X axis 202 and Y axis 204) may be determined. In these embodiments, there may be a delayed start in modification of the rendered AR air-written content until calibration process 200 has been fully completed.

In cases where sensors 104 include multi-array sensors, such as a three-array sensor or multiple single-array sensors, the determination of the Z-dimension (e.g., Z axis 210) may occur at the beginning of calibration process 200, along with the determination of the initial two-dimensional coordinate plane (i.e., the X-Y plane defined by X axis 202 and Y axis 204).

In either case, once calibration process 200 is completed, Z-dimension projection (i.e., along Z axis 210) of movements of hand 102 of the originator identified by the one or more sensors 104 may be associated with an AR visualization modification of the air written content on the displays of the AR devices to simulate emphasis or other cues conferred on one or more words that are air-written by the originator. These AR visualization modifications may be established or configured beforehand by generating a predetermined map or database (e.g., during learning by air writing system 100 during calibration process 200) of the correspondence between movement along the Z-dimension (i.e., by hand 102 of the originator) to AR visualization modifications for display of the air-written content on the displays of the AR devices. In some embodiments, the predetermined map or database may be generated based on input from subject matter experts, specifications, and/or policies.

During an air-writing session, sensors 104 of air writing system 100 may identify movements of hand 102 of the originator in three dimensions (e.g., along each of X axis 202, Y axis 204, and Z axis 210) to determine the one or more words being air-written by the originator and any emphasis or other cues that are to be conferred on those words. According to the techniques described herein, sensors 104 of air writing system 100 may detect or identify a relative depth of movement in the Z-direction (i.e., along Z axis 210) and/or a suddenness or acceleration of movement in the Z-direction made by hand 102 of the originator to determine emphasis or other cues that are to be conferred on one or more words of the air-written content. That is, an amount of relative displacement of a finger or hand of the originator in the Z-direction and/or a speed of that displacement may be used by air writing system 100 to determine which words the originator intends to add emphasis or other cues to for display on the AR devices.

Using the Z-dimension projection geometry in this context allows for augmenting the presentation of the AR content, as perceived by members of the audience (i.e., users of the AR devices), to simulate emphasis, or other cues, on the displays of the AR devices. With this configuration, a variety of different types or forms of emphasis or other cues may be provided to the air-written content displayed on the AR devices. For example, the emphasis or other cues may include, but are not limited to one or more of the following: size, boldness, italics, color, drop shadow (3D-effect), motion, imagery, multimedia, emotional tone (e.g., angry, sad, happy, etc.), volume (loud, whisper, etc.), and other gesture types, as well as combinations thereof.

Figure 3:
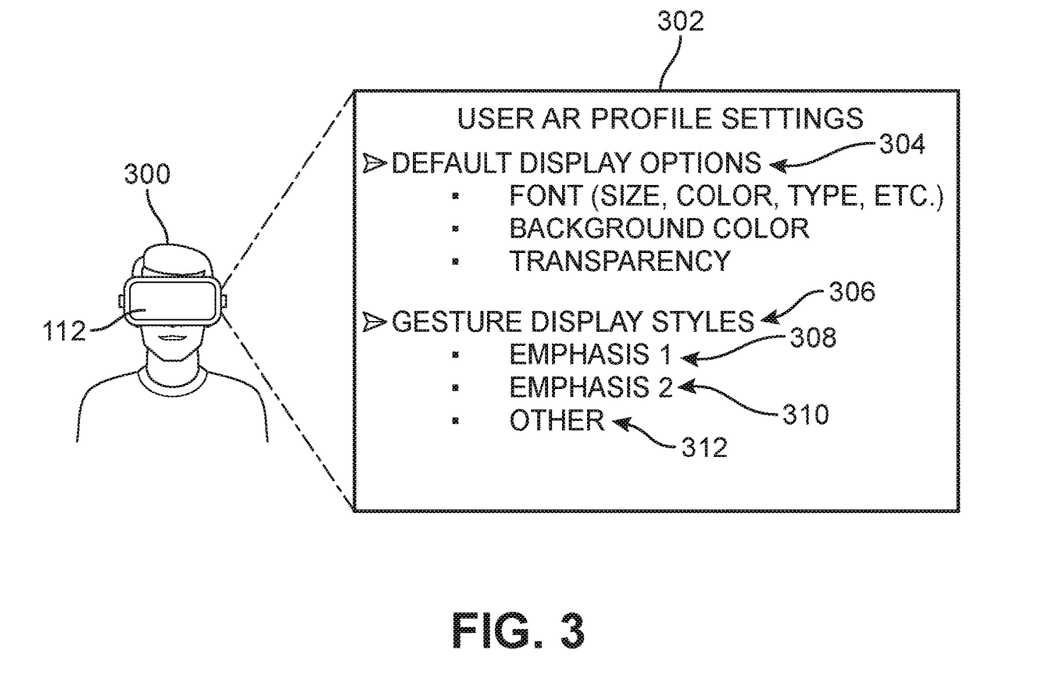
FIG. 3 is a schematic view of an example embodiment of a user profile for an AR device.

FIG. 3 is a schematic view of an example embodiment of a user profile for an AR device. In some embodiments, a user of an AR device may calibrate or define a baseline set of attributes for preferred and/or personalized AR visualization modifications of the air written content that has been emphasized or has other cues conferred on it by the originator based on the gestures made by the originator that are associated with the emphasis or other cues. For example, as shown in FIG. 3, a first user 300 of first AR device 112 is associated with a profile 302. Profile 302 includes a plurality of settings or attributes related to displaying air-written content on the display of first AR device 112.

In this embodiment, profile 302 of first user 300 includes default display options 304, including, for example, settings related to display fonts (i.e., size, color, type, etc.), background colors, transparency, as well as other options for displaying the air-written content on the display of first AR device 112. Default display options 304 for profile 302 of first user 300 can apply globally to the air-written content and/or other AR content that is displayed on the display of first AR device 112. In an example embodiment, profile 302 of first user 300 also includes settings for gesture display styles 306. In this embodiment, the settings for gesture display styles 306 apply specifically to the various types of gestures that may be made by the originator to confer emphasis or other cues to particular words or characters in the air-written content.

In an example embodiment, the settings for gesture display styles 306 of profile 302 of first user 300 may include settings for at least two different gesture types, including a first emphasis 308 to be conferred on the air-written content and a second emphasis 310 to be conferred on the air-written content. In the example embodiments, the gesture types, including at least first emphasis 308 and second emphasis 310, can be determined based on identifying movements made by the hand (e.g., hand 102) or the finger of the originator that correspond to the gesture type associated with the emphasis to be conferred on the air-written content. For example, the relative movements of the originator's hand or finger relative to the Z-dimension (i.e., along Z axis 210) may be used to determine the gesture types. Gesture display styles 306 provide first user 300 with the ability to customize or personalize the way that the emphasis for each gesture type is displayed on first AR device 112.

First user 300 may select a first gesture display style to display air-written content that has been conferred the first emphasis 308 by the originator on the display of first AR device 112 according to the settings for gesture display styles 306 of profile 302 of first user 300. For example, first emphasis 308 may be displayed on first AR device 112 using the first gesture display style that shows the emphasized words or characters in a larger size font. Similarly, first user 300 may also select a second gesture display style that is different from the first gesture display style, to display air-written content that has been conferred the second emphasis 310 by the originator on the display of first AR device 112 according to the settings for gesture display styles 306 of profile 302 of first user 300. For example, second emphasis 310 may be displayed on first AR device 112 using the second gesture display style that shows the emphasized words or characters in an italicized or bolded font. With this arrangement, different gesture types associated with different emphasis or other cues conferred on the air-written content by the originator may be displayed using different gesture display styles on the display of a user's AR device based on that user's profile. Additionally, each user may choose to display the different emphasis or other cues conferred on the air-written content in a customized or personalized manner according to their profile settings.

It should be understood that profile 302 of first user 300 may include additional and/or optional settings beyond those shown in FIG. 3. For example, the settings for gesture display styles 306 of profile 302 of first user 300 may further include an other setting 312 that allows first user 300 to associate additional gesture types with a gesture display style for displaying on first AR device 112. In this manner, if an originator confers an emphasis or other cue on the air-written content that is not already associated with a gesture type and gesture display style, other setting 312 may be used to display this emphasized content on first AR device 112 in a way that is noticeable or conspicuous to first user 300.

In some embodiments, user profiles (e.g., profile 302) for one or more of the user of the AR devices in communication with the air writing system (e.g., air writing system 100) may be provided to the air writing system to automatically adjust the AR visualizations based on the user's profile. In these embodiments, a user's profile may include a predetermined group of settings associated with a profile type for displaying the air-written content and for one or more gesture display styles for displaying the emphasis conferred on the content by the originator. For example, a profile type for "low-vision" may include a predetermined group of display settings for low vision users that automatically modifies the displayed air-written content, including emphasis and other cues, on those user's AR devices in a way that is optimized for low vision, such as providing additional contrast, high-contrast background color, large font, font types that are easier to read, etc.

Figure 4:
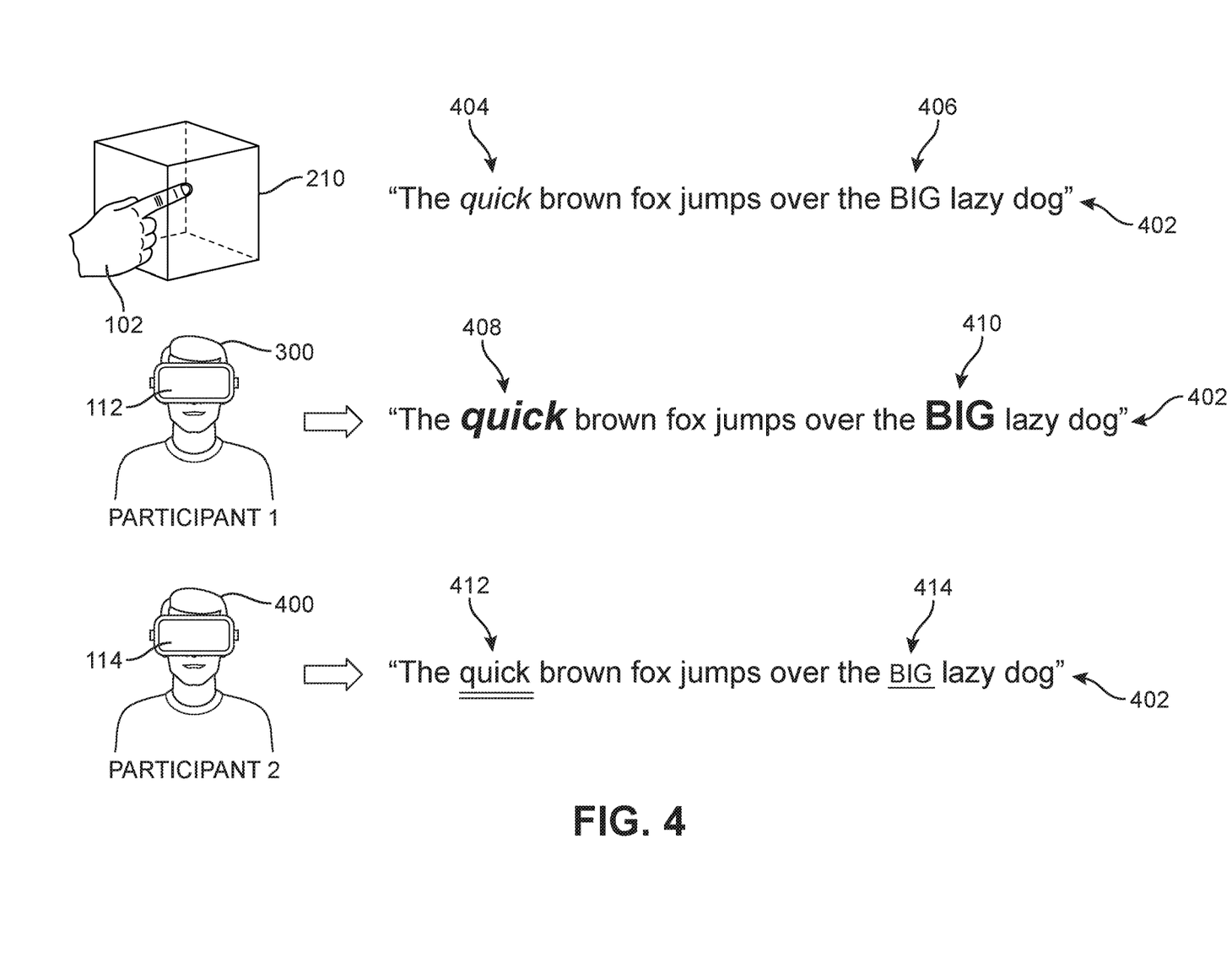
FIG. 4 is a representative view of an example embodiment of emphasized air-written words being displayed on two different AR devices.

Referring now to FIG. 4, a representative view of an example embodiment of emphasized air-written words being displayed on two different AR devices is shown. In this embodiment, the originator is conducting an air-writing session with at least two different participants or users, including first user 300 of first AR device 112 and a second user 400 of second AR device 114. As shown in FIG. 4, the originator uses hand 102 to air-write a phrase 402, for example, "The quick brown fox jumps over the big lazy dog." In this embodiment, the originator confers emphasis to at least two different words in phrase 402, including a first emphasis 404 conferred on a first word (e.g., "quick") and a second emphasis 406 conferred on a second word (e.g., "big").

In this embodiment, each of first emphasis 404 conferred on the first word and second emphasis 406 conferred on the second word may be determined based on identifying movements of hand 102 or the finger of the originator relative to the Z-dimension (i.e., along Z axis 210) that correspond to a gesture type associated with each emphasis. The first emphasis 404 conferred on the first word (e.g., "quick") may be determined by analyzing the identified movements of hand 102 along Z axis 210 to determine a gesture type associated with first emphasis 404, for example, by identifying an acceleration or speed of movement of hand 102 or the finger of the originator along Z axis 210 that has been mapped or corresponds to first emphasis 404. Similarly, second emphasis 406 conferred on the second word (e.g., "big") may be determined by analyzing the identified movements of hand 102 along Z axis 210 to determine a gesture type (different than the gesture type of first emphasis 404) associated with second emphasis 406, for example, by identifying a relative depth or amount of movement of hand 102 or the finger of the originator along Z axis 210 that has been mapped or corresponds to second emphasis 406.

According to the techniques of the example embodiments described herein, each of first emphasis 404 conferred on the first word and second emphasis 406 conferred on the second word in phrase 402 by the originator may be displayed differently on the AR devices of each user. In this embodiment, phrase 402 that was air-written by the originator is displayed on first AR device 112 of first user 300 and is also displayed on second AR device 114 of second user 400. However, first emphasis 404 conferred on the first word (e.g., "quick") and second emphasis 406 conferred on the second word (e.g., "big") in phrase 402 by the originator is displayed differently on first AR device 112 of first user 300 than on second AR device 114 of second user 400.

For example, phrase 402 is displayed on first AR device 112 of first user 300 using a first gesture display style 408 (e.g., larger font 18 pt, italicized, and bold) for first emphasis 404 conferred on the first word (e.g., "quick") and a second gesture display style 410 (e.g., larger font 24 pt, capital letters, and bold) for second emphasis 406 conferred on the second word (e.g., "big") based on the profile (e.g., profile 302) of first user 300 utilizing first AR device 112. In contrast, phrase 402 is displayed on second AR device 114 of second user 400 using a third gesture display style 412 (e.g., double underline) for first emphasis 404 conferred on the first word (e.g., "quick") and a fourth gesture display style 414 (e.g., capital letters and single underline) for second emphasis 406 conferred on the second word (e.g., "big") based on the profile of second user 400 utilizing second AR device 114. With this arrangement, the same emphasis conferred on the same words by the originator may be displayed using completely different gesture display styles on each user's AR device according to each user's profile so that AR visualization modifications of the air written content that has been emphasized or has other cues conferred on it by the originator are customized or personalized to the individual user.

It should be understood that the example embodiment shown in FIG. 4 was described in reference to air-written content in the English language. However, the techniques of the present embodiments may be applied to air-writing in any language. That is, the system and method of the example embodiments is language agnostic, as emphasis or other cues may be conferred on characters and/or words in any language.

Figure 5:
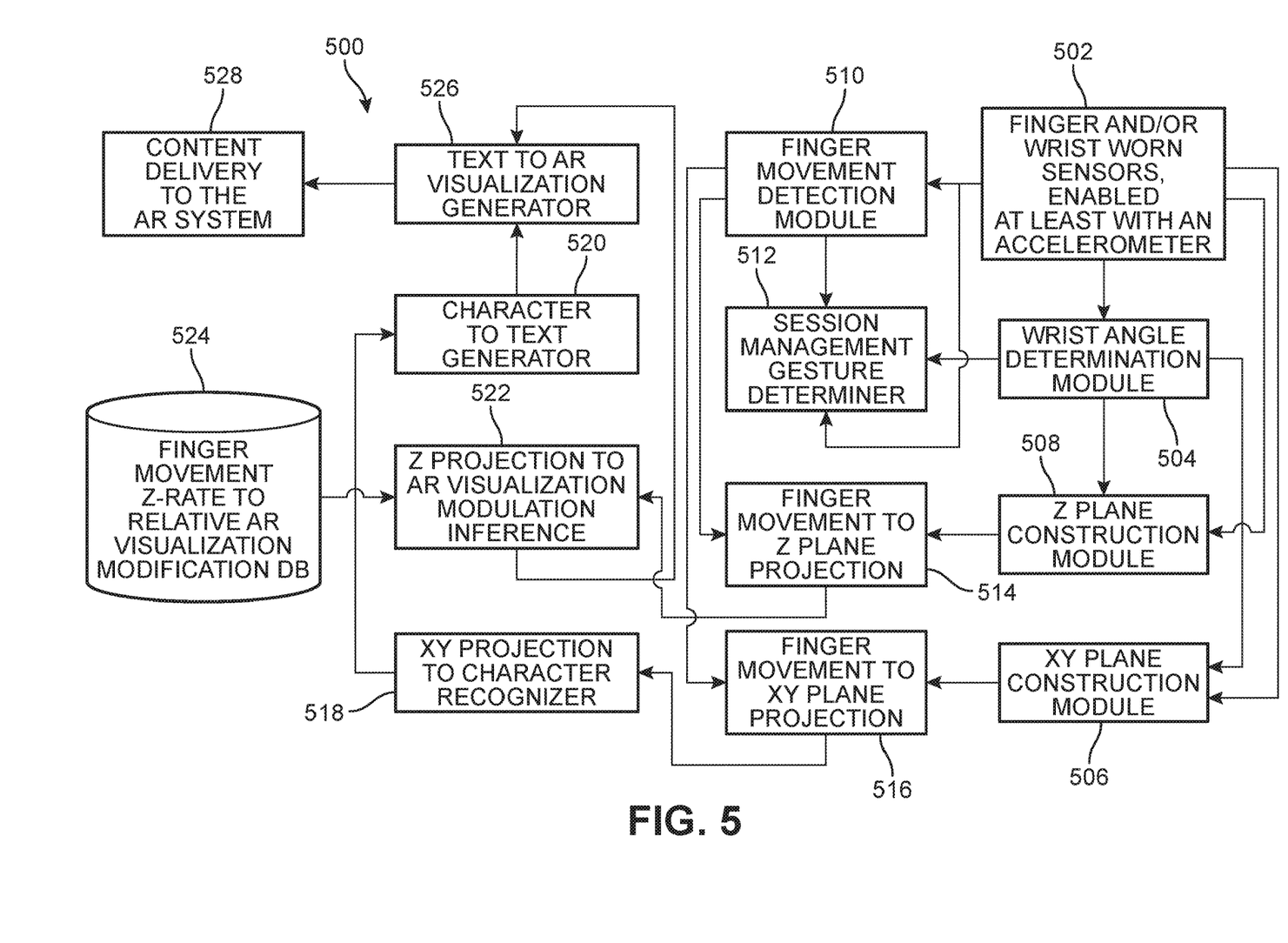
FIG. 5 is a schematic view of an example embodiment of components of an air writing system.

FIG. 5 is a schematic view of an example embodiment of components 500 of air writing system 100. In some embodiments, air writing system 100 may include a plurality of components 500 that may be embodied in hardware, software, or a combination of both. In this embodiment, plurality of components 500 of air writing system 100 includes at least finger and/or wrist worn sensors 502 that may be enabled to detect movement of a hand or finger of the originator using an accelerometer. Finger and/or wrist sensors 502 may include the one or more sensors 104 shown in FIG. 1. A wrist angle determination module 504 may use the information from finger and/or wrist sensors 502 to determine wrist angles of the originator during an air-writing session. Additionally, as described above in reference to FIG. 2, an XY plane construction module 506 and a Z plane construction module 508 may use information from finger and/or wrist sensors 502 and wrist angle determination module 504 to construct or determine the XY plane and the Z plane (e.g., as part of calibration process 200).

Plurality of components 500 also includes a finger movement detection module 510 that receives information from finger and/or wrist sensors 502 to determine movement of the finger of the originator. A session management gesture determiner 512 receives information from finger and/or wrist sensors 502, finger movement detection module 510, and wrist angle determination module 504 to determine gestures made by the originator during the air-writing session. The finger movement detection module 510 is also used for determining a finger movement to Z plane projection 514 and a finger movement to XY plane projection 516 to distinguish between movements made by the finger or hand of the originator in the XY plane, which are used to air-write the characters and/or words, and movements made in the Z direction, which are used to confer emphasis or other cues on the air-written characters and/or words.

As shown in FIG. 5, the information from finger movement to XY plane projection 516 is provided to an XY projection to character recognizer 518 which is configured to translate the movements of the finger or hand of the originator in the XY plane to the characters forming the words that are air-written by the originator. The output of the XY projection to character recognizer 518 is provided to a character to text generator 520 which converts the recognized XY plane movements into text, including characters and/or words.

The information from finger movement to Z plane projection 514 is provided to a Z projection to AR visualization modulation inference 522. The Z projection to AR visualization modulation inference 522 is configured to translate the movements of the finger or hand of the originator in the Z direction to perform modulation of the output AR visualization of the air written content to simulate emphasis or other cues conferred on words by the originator. In some embodiments, Z projection to AR visualization modulation inference 522 may access or look up the movements in the Z direction in a map or database, such as finger movement Z-rate to relative AR visualization modification database 524. In an example embodiment, database 524 may be a predetermined map or database of the correspondence between movement along the Z direction (i.e., by hand 102 of the originator along Z axis 210) to AR visualization modifications for display of the air-written content on the displays of the AR devices.

For example, database 524 may include different gesture types associated with different emphasis or other cues that are based on various movements in the Z direction by the finger or hand of the originator. As described above, these movements may include relative depth or amount of movement in the Z direction and/or acceleration or speed of movements in the Z direction. Accordingly, different values for the parameters (e.g., depth, speed, and combinations thereof) may be associated with different emphasis. For example, a first emphasis may be associated with a first value (or range of values) for a relative depth of movement of the finger or hand of the originator in the Z direction (e.g., 2 cm or 2-4 cm) and a second emphasis may be associated with a second value (or range of values) for a relative depth of movement that is larger or smaller than the first value (e.g., 5 cm or 5-8 cm).

Similarly, other types of emphasis or other cues may be associated with values of relative depth, speed or acceleration, or a combination of depth and speed of movements of the finger or hand of the originator in the Z direction. For example, in another embodiment, an emphasis may be associated with a minimum value for relative depth of movement in the Z direction as well as a minimum value for an acceleration or speed of that movement in the Z direction. With this arrangement, database 524 may include a plurality of different types or kinds of emphasis or other cues that have been mapped or correspond to various movements in the Z direction that are identified by sensors of the air writing system.

The modulation of the output AR visualization of the air written content to simulate emphasis or other cues from AR visualization modulation inference 522 and the text from character to text generator 520 are provided to a text to AR visualization generator 526. Text to AR visualization generator 526 prepares the output of the air-writing session, including the air-written content and emphasis or other cues, for content delivery 528 or communication to the air writing system and the users of the AR devices for display.

Figure 6:
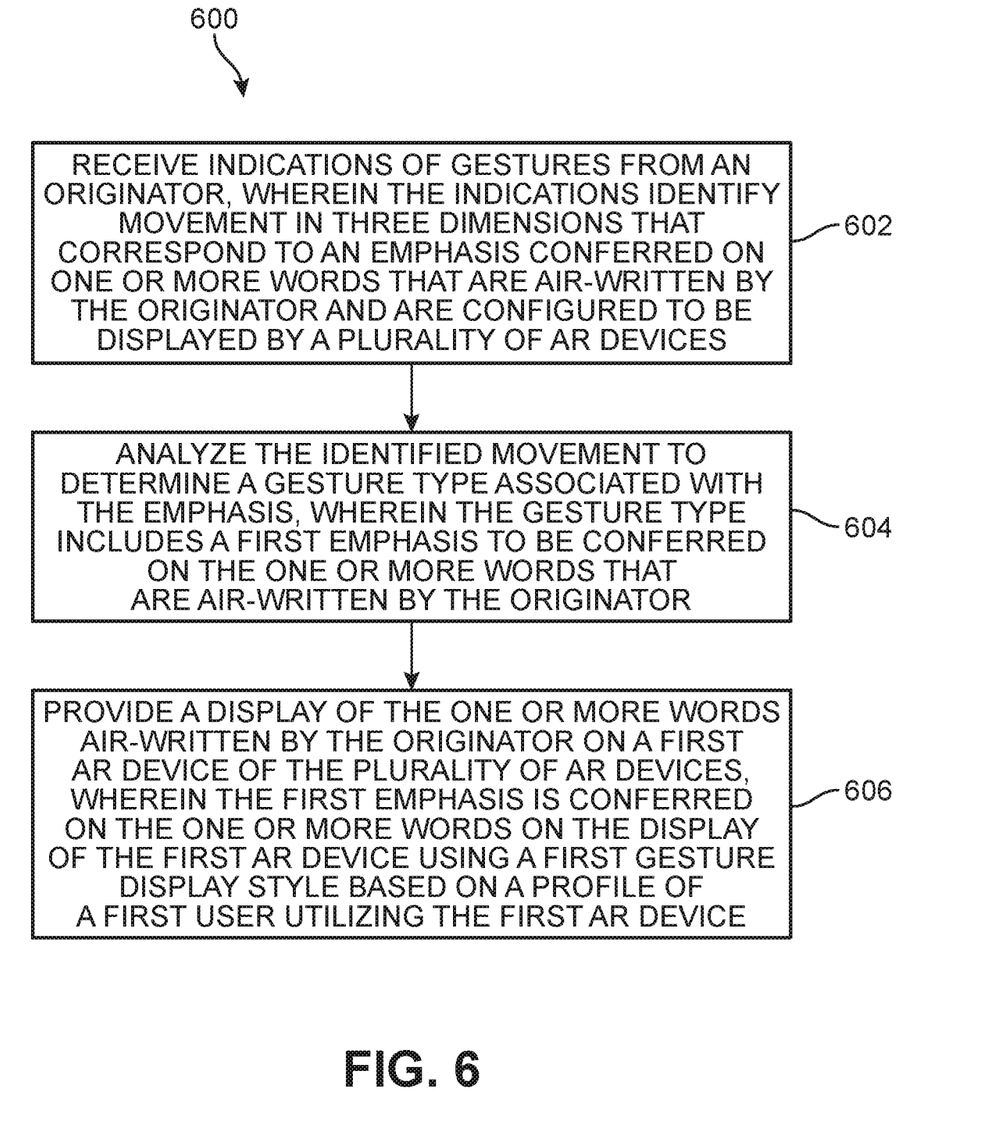
FIG. 6 is a flowchart of an example embodiment of a method for translating air writing to AR devices.

Referring now to FIG. 6, a flowchart of an example embodiment of a method 600 for translating air writing to AR devices is illustrated. In an example embodiment, method 600 may be implemented by air writing system 100, as described above. In other embodiments, method 600 may be implemented by a processor or computer configured for translating air-written content to AR devices.

In this embodiment, method 600 begins at an operation 602. At operation 602, indications of gestures from an originator are received. The indications identify movement in three dimensions that correspond to an emphasis conferred on one or more words that are air-written by the originator and are configured to be displayed by a plurality of AR devices. For example, as described above, one or more sensors 104 may be used to track or capture movement of a hand (e.g., hand 102) or a finger of the originator. In addition, in some embodiments, prior to operation 602 or as part of operation 602, calibration process 200 may be implemented to construct the XY coordinate plane and establish or determine the Z direction relative to the originator's hand or finger, as described above.

Next, method 600 includes an operation 604. At operation 604, the identified movement of the originator's hand or finger from operation 602 is analyzed to determine a gesture type associated with the emphasis. The gesture type includes at least a first emphasis to be conferred on the one or more words that are air-written by the originator. For example, as described above, different gesture types made by the originator may be associated with different emphasis or other cues.

Method 600 also includes an operation 606 that includes providing a display of the one or more words air-written by the originator on a first AR device of the plurality of AR devices. At operation 606, the first emphasis is conferred on the one or more words on the display of the first AR device using a first gesture display style based on a profile of a first user utilizing the first AR device. For example, as described above in reference to FIG. 4, each user may customize or personalize the gesture display styles for display on their AR device using their user profile so that the same emphasis may be displayed differently on each user's AR device according to their profile settings. Method 600 may be subsequently repeated when a new phrase is air-written by the originator and/or for a new air-writing session. Additionally, method 600 may be implemented with respect to each AR device that is part of an air-writing session, such as the plurality of AR devices 112, 114, 116, 120, 122 shown in FIG. 1.

Figure 7:
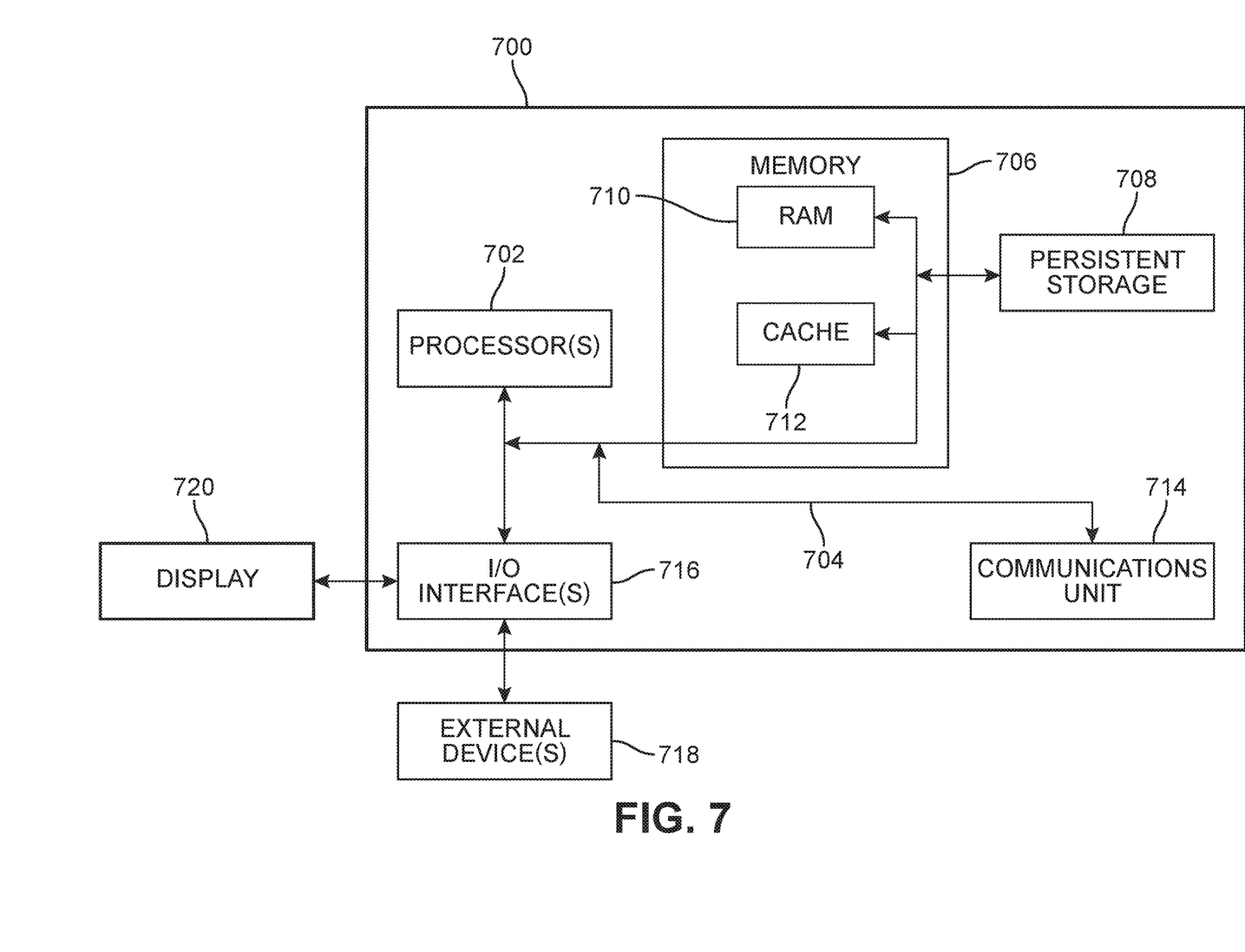
FIG. 7 is a block diagram of an example embodiment of a computer of an air writing system.

FIG. 7 is a block diagram of an example embodiment of a computer 700 of air writing system 100. FIG. 7 illustrates a block diagram of components of a representative computer 700 including a processor 702 that is configured to implement the techniques for translating air writing to an AR device described herein according to an example embodiment. Processor 702 may be associated with a personal computer and/or a server, as well any type of computing device. It should be appreciated that FIG. 7 provides only an illustration of one implementation and does not imply any limitations with regard to the environments in which different embodiments may be implemented. Many modifications to the depicted environment may be made.

As shown in FIG. 7, computer 700 includes a communications fabric 704, which provides communications between processor(s) 702, memory 706, persistent storage 708, a communications unit 714, and input/output (I/O) interface(s) 716. Communications fabric 704 can be implemented with any architecture designed for passing data and/or control information between processors (such as microprocessors, communications and network processors, etc.), system memory, peripheral devices, and any other hardware components within a system. For example, communications fabric 704 may be implemented with one or more buses.

Memory 706 and persistent storage 708 are computer-readable storage media. In this embodiment, memory 706 includes a random access memory (RAM) 710 and a cache memory 712. In general, memory 706 can include any suitable volatile or non-volatile computer-readable storage media.

One or more programs may be stored in persistent storage 708 for access and/or execution by one or more of the respective processors 702 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 408.

Communications unit 714, in these examples, provides for communications with other processors, data processing systems, or devices. For example, to allow air writing system 100 to communicate with one or more AR devices of the plurality of AR devices 112, 114, 116, 120, 122 shown in FIG. 1. In an example embodiment, communications unit 714 may include one or more network interface cards. Communications unit 714 may provide communications through the use of either or both physical and wireless communications links.

I/O interface(s) 716 allows for input and output of data with other devices that may be connected to computer 700. For example, I/O interface 716 may provide a connection to external devices 718, such as a keyboard, keypad, a touch screen, an assistive or adaptive technology device, and/or some other suitable input device. External devices 718 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 708 via I/O interface(s) 716. I/O interface(s) 716 may also connect to a display 720. Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present embodiments may be embodied in a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for translating air writing to an augmented reality (AR) device comprising:

receiving indications of gestures from an originator, wherein the indications identify movement in three dimensions that correspond to emphasis conferred on one or more words that are air-written by the originator and are configured to be displayed by a plurality of AR devices;

analyzing the identified movement to determine a gesture type associated with the emphasis, wherein the gesture type includes a first emphasis to be conferred on the one or more words that are air-written by the originator, wherein the first emphasis that is conferred is further determined by detecting a depth and speed of the hand and finger movement in a z-axis of the three dimensions corresponding to a predetermined mapping that places different visual effects and appearances on the one or more words; and providing a display of the one or more words air-written by the originator on a first AR device of the plurality of AR devices, wherein the first emphasis is conferred on the one or more words on the display of the first AR device using a first gesture display style based on a profile of a first user utilizing the first AR device.

2. The method according to claim 1, wherein the first gesture display style is selected from a group consisting of size, font, color, background, and contrast.

3. The method according to claim 1, wherein the gesture type further comprises a second emphasis to be conferred on the one or more words that are air-written by the originator; and wherein the second emphasis is conferred on the one or more words on the display of the first AR device using a second gesture display style based on the profile of the first user.

4. The method according to claim 3, wherein the second gesture display style is selected from a group consisting of size, font, color, background, and contrast; and wherein the second gesture display style is different from the first gesture display style.

5. The method according to claim 1, further comprising:

providing a display of the one or more words air-written by the originator on a second AR device of the plurality of AR devices, wherein the first emphasis is conferred on the one or more words on the display of the second AR device using a third gesture display style based on a profile of a second user utilizing the second AR device.

6. The method according to claim 5, wherein the third gesture display style of the first emphasis conferred on the one or more words displayed on the second AR device is different from the first gesture display style of the first emphasis conferred on the one or more words displayed on the first AR device for the same identified movement.

7. The method according to claim 1, wherein receiving the indications of gestures from the originator comprises detecting movement in three dimensions associated with a hand or finger of the originator from at least one sensor.

8. A computer program product for translating air writing to an augmented reality (AR) device, the computer program product comprising a computer readable storage medium having program instructions embodied therewith, the program instructions executable by a processor to cause the processor to perform a method comprising:

receiving indications of gestures from an originator, wherein the indications identify movement in three dimensions that correspond to emphasis conferred on one or more words that are air-written by the originator and are configured to be displayed by a plurality of AR devices;

analyzing the identified movement to determine a gesture type associated with the emphasis, wherein the gesture type includes a first emphasis to be conferred on the one or more words that are air-written by the originator, wherein the first emphasis that is conferred is further determined by detecting a depth and speed of the hand and finger movement in a z-axis of the three dimensions corresponding to a predetermined mapping that places different visual effects and appearances on the one or more words; and providing a display of the one or more words air-written by the originator on a first AR device of the plurality of AR devices, wherein the first emphasis is conferred on the one or more words on the display of the first AR device using a first gesture display style based on a profile of a first user utilizing the first AR device.

9. The computer program product of claim 8, wherein the first gesture display style is selected from a group consisting of size, font, color, background, and contrast.

10. The computer program product of claim 8, wherein the gesture type further comprises a second emphasis to be conferred on the one or more words that are air-written by the originator; and wherein the second emphasis is conferred on the one or more words on the display of the first AR device using a second gesture display style based on the profile of the first user.

11. The computer program product of claim 10, wherein the second gesture display style is selected from a group consisting of size, font, color, background, and contrast; and wherein the second gesture display style is different from the first gesture display style.

12. The computer program product of claim 8, wherein the instructions further cause the processor to:

provide a display of the one or more words air-written by the originator on a second AR device of the plurality of AR devices, wherein the first emphasis is conferred on the one or more words on the display of the second AR device using a third gesture display style based on a profile of a second user utilizing the second AR device.

13. The computer program product of claim 12, wherein the third gesture display style of the first emphasis conferred on the one or more words displayed on the second AR device is different from the first gesture display style of the first emphasis conferred on the one or more words displayed on the first AR device for the same identified movement.

14. The computer program product of claim 8, wherein receiving the indications of gestures from the originator comprises detecting movement in three dimensions associated with a hand or finger of the originator from at least one sensor.

15. A system for translating air writing to an augmented reality (AR) device, the system comprising:

one or more AR devices;

an air writing system in communication with the one or more AR devices, the air writing system including at least one processor configured to perform a method comprising:

receiving indications of gestures from an originator, wherein the indications identify movement in three dimensions that correspond to emphasis conferred on one or more words that are air-written by the originator and are configured to be displayed by a plurality of AR devices;

analyzing the identified movement to determine a gesture type associated with the emphasis, wherein the gesture type includes a first emphasis to be conferred on the one or more words that are air-written by the originator, wherein the first emphasis that is conferred is further determined by detecting a depth and speed of the hand and finger movement in a z-axis of the three dimensions corresponding to a predetermined mapping that places different visual effects and appearances on the one or more words; and providing a display of the one or more words air-written by the originator on a first AR device of the plurality of AR devices, wherein the first emphasis is conferred on the one or more words on the display of the first AR device using a first gesture display style based on a profile of a first user utilizing the first AR device.

16. The system according to claim 15, wherein the first gesture display style is selected from a group consisting of size, font, color, background, and contrast.

17. The system according to claim 15, wherein the gesture type further comprises a second emphasis to be conferred on the one or more words that are air-written by the originator; and wherein the second emphasis is conferred on the one or more words on the display of the first AR device using a second gesture display style based on the profile of the first user.

18. The system according to claim 15, wherein the second gesture display style is selected from a group consisting of size, font, color, background, and contrast; and wherein the second gesture display style is different from the first gesture display style.

19. The system according to claim 15, wherein the at least one processor is further configured to:

provide a display of the one or more words air-written by the originator on a second AR device of the one or more AR devices, wherein the first emphasis is conferred on the one or more words on the display of the second AR device using a third gesture display style based on a profile of a second user utilizing the second AR device; and wherein the third gesture display style of the first emphasis conferred on the one or more words displayed on the second AR device is different from the first gesture display style of the first emphasis conferred on the one or more words displayed on the first AR device for the same identified movement.

20. The system according to claim 15, wherein the air writing system further comprises at least one sensor; and wherein receiving the indications of gestures from the originator comprises detecting movement in three dimensions associated with a hand or finger of the originator from the at least one sensor.

* * * * *